United States Patent [19]

Merrick

[11] Patent Number: 5,799,161
[45] Date of Patent: Aug. 25, 1998

[54] METHOD AND APPARATUS FOR CONCURRENT DATA ROUTING

[75] Inventor: Dale Merrick, Beaverton, Oreg.

[73] Assignee: Intel Corporation, Santa Clara, Calif.

[21] Appl. No.: 709,904

[22] Filed: Sep. 9, 1996

Related U.S. Application Data

[63] Continuation of Ser. No. 83,045, Jun. 25, 1993, abandoned.

[51] Int. Cl.⁶ .................................................. G06F 13/38
[52] U.S. Cl. ................................................................ 395/309
[58] Field of Search ........................... 395/308, 309, 395/200.81, 200.82, 200.83; 370/402; 340/825.5, 825.51, 825.52, 825.53

[56] References Cited

U.S. PATENT DOCUMENTS

| | | | |
|---|---|---|---|
| 4,476,527 | 10/1984 | Clayton et al. | 395/275 |
| 4,484,273 | 11/1984 | Stiffer et al. | 395/325 |
| 4,635,192 | 1/1987 | Ceccon et al. | 395/325 |
| 4,656,592 | 4/1987 | Spaanenburg et al. | 364/490 |
| 4,935,942 | 6/1990 | Hwang et al. | 375/106 |
| 4,985,830 | 1/1991 | Atac et al. | |
| 5,105,188 | 4/1992 | Jung et al. | 340/825.05 |
| 5,124,990 | 6/1992 | Williamson | 371/20.6 |
| 5,265,211 | 11/1993 | Amini et al. | 395/325 |
| 5,276,807 | 1/1994 | Kodama et al. | 395/200 |
| 5,359,715 | 10/1994 | Heil et al. | 395/325 |
| 5,379,384 | 1/1995 | Solomon | 395/325 |
| 5,379,386 | 1/1995 | Swarts et al. | 395/325 |
| 5,392,412 | 2/1995 | McKenna | 395/425 |
| 5,396,638 | 3/1995 | Kanekura | 395/775 |
| 5,446,572 | 8/1995 | Husbands et al. | 359/133 |

OTHER PUBLICATIONS

Microsoft Press Computer Dictionary 1993, p. 344.
"Intel 82350 DT EISA Chip Set", 1991, Intel Corporation, pp. 127–153, 198.
"VL82C(PC/AT) IBM PC/AT Compatible Chip Set", May 1987, VLSI Technology, Inc.
"82D201, 82C201–10/82C202/82A203/82A204/82A205 CS8220: PC/AT Compatible ChipSet", Feb. 1986, Chips & Techology, Inc.

*Primary Examiner*—Ayaz R. Sheikh
*Assistant Examiner*—Paul R. Myers
*Attorney, Agent, or Firm*—Blakely, Sokoloff, Taylor & Zafman

[57] ABSTRACT

A data router for routing data among a plurality of buses has a plurality of interfaces, each interface for engaging in data transfers between an associated bus and at least two other interfaces. Each interface has a means for data transfer to transfer data from said associated bus to an interface output. Each interface also has a means for receiving data from the at least two other interfaces. Each interface is coupled to at least two other interfaces by way of separate data paths between the interface output and the means for receiving data of each other interface. Each interface transfers the received data to an associated bus.

14 Claims, 9 Drawing Sheets

METHOD AND APPARATUS FOR CONCURRENT DATA ROUTING

This is a continuation of application Ser. No. 08/083,045, filed Jun. 25, 1993, now abandoned.

BACKGROUND OF THE INVENTION

1. Field of the Invention

The present invention relates to data processing systems, and more particularly to the routing of data in such systems.

2. Art Background

Many modern computer systems utilize a multiple bus structure, typically including at least a host (CPU) bus and an expansion bus. Data in such systems can travel over many different pathways—host CPU to and from memory, host CPU to and from devices on the expansion bus (including intelligent bus masters) and expansion bus devices to and from memory. The system must provide for routing and timing control of data over these data paths. In addition, the system must insure that data follows the protocol of the devices on each bus. To accomplish the latter goal, some chip sets include chips that reformat data from a wide bus format to a narrower format. For example, the 82A205 chip manufactured by Chips and Technology, Inc. disassembles 32 bit data arriving from the CPU and outputs it through a timed staging latch to a peripheral bus following the 8 bit Industry Standard Architecture (ISA) standard to insure bit length compatibility. In this manner, the staging latches act as a doubleword to byte converter in disassembling the 32 bit data words.

The 82353 advanced data path chip manufactured by the assignee of the present invention, Intel Corporation, also provides for the assembly and disassembly of data for compatibility between Intel's x86 processors and the Extended Industry Standard Architecture (EISA) bus protocol. The 82353 features a memory interface including host read and write latches and system read and write latches. The host read latches are coupled to a host interface permitting the host to read main memory data stored in the host read latches. The system read latches and the write latches are coupled to an internal bi-directional data bus, which in turn couples the host interface to the system (peripheral bus) interface. With this configuration, the host can read from the host read latches while devices on the system bus write data into the write latches without requiring the host bus to wait for the system bus to complete its write operation or vice-versa. However, this arrangement does not allow the host to write to main memory while peripheral devices attempt to read or write to main memory because both share the internal data bus.

It is desirable to provide a data routing unit that would allow for full concurrency of bus operations. That is, each bus could perform a write operation to main memory or to another bus without first requiring control of the destination bus.

It is also desirable to provide for control of routing operations between buses in a computer system and for control of the posting of data using a minimum number of control lines, thus minimizing the number of pins on an integrated circuit package required for these operations.

SUMMARY OF THE INVENTION

The present invention provides a data router for routing data among a number of buses. A first interface means is coupled to a first bus and engages in data transfers between the first bus and at least one other interface means. The first interface means includes first posting means for posting data from the first bus, the posted data being provided at a first interface output. The first interface means further includes first receiving means for receiving data. A second interface means is coupled to a second interface bus and engages in data transfers between the second bus and at least one other interface means. The second interface means includes second interface transfer means for transferring data from the second bus to a second interface output. The second interface output is coupled to the first receiving means. The second interface means further includes second receiving means for receiving data, the second receiving means being coupled to the first interface output. A third interface means is coupled to a third bus and engages in data transfers between the third bus and at least one other interface means. The third interface means includes third interface transfer means for transferring data from the third bus to a third interface output, the third interface output being coupled to the first and second receiving means. The third interface means further includes third receiving means for receiving data, which is coupled to the first and second interface outputs.

DETAILED DESCRIPTION OF THE INVENTION

The present invention provides a method and apparatus for concurrent data routing. For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail in order to avoid unnecessarily obscuring the present invention.

The present invention provides for the routing of data among buses in a computer system using the minimum number of control lines and at the same time allowing for fully concurrent bus operations.

Figure 1:
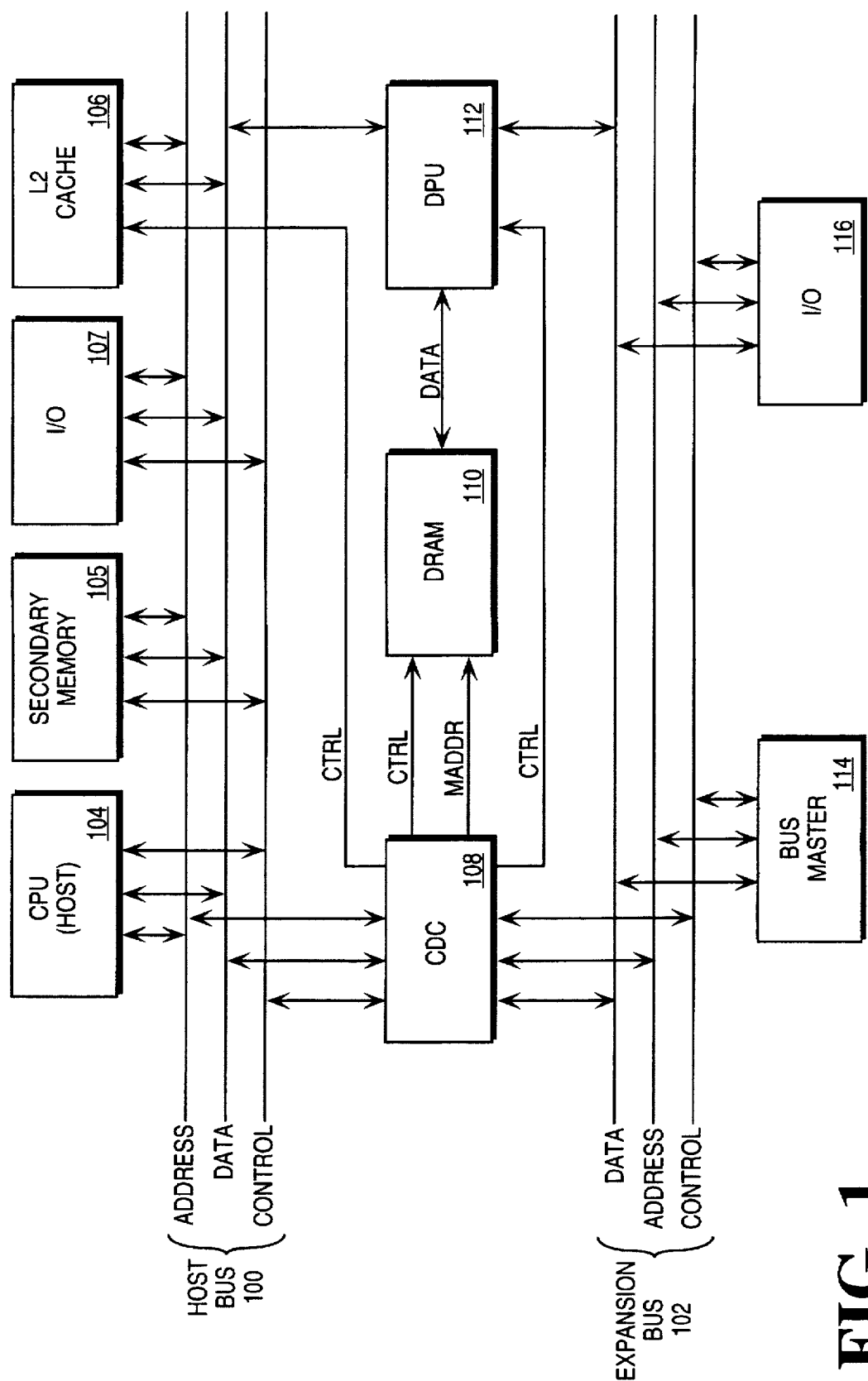
FIG. 1 is a diagram of a computer system incorporating the present invention.

FIG. 1 is a computer system incorporating the data path unit of the present invention. A preferred embodiment of the system of the present invention includes a host bus 100 and an expansion bus 102. A CPU 104, secondary memory 105, a second level cache 106 and I/O 107 are coupled to the host bus. A cache DRAM controller 108 is coupled to both the host bus 100 and the expansion (system) bus 102. The cache DRAM controller 108 provides control signals to the second level cache 106, dynamic random access main memory (DRAM) 110 and the data path unit (DPU) 112 of the present invention.

A bus master 114 and one or more I/O devices 116 are coupled to the expansion bus 102. The bus master may be a smart device with its own CPU or a direct memory access (DMA) controller. The DPU 112 of the preferred embodiment routes data among the host bus 100, the expansion bus 102 and DRAM 110 under the control of control signals provided by CDC 108.

Figure 2:
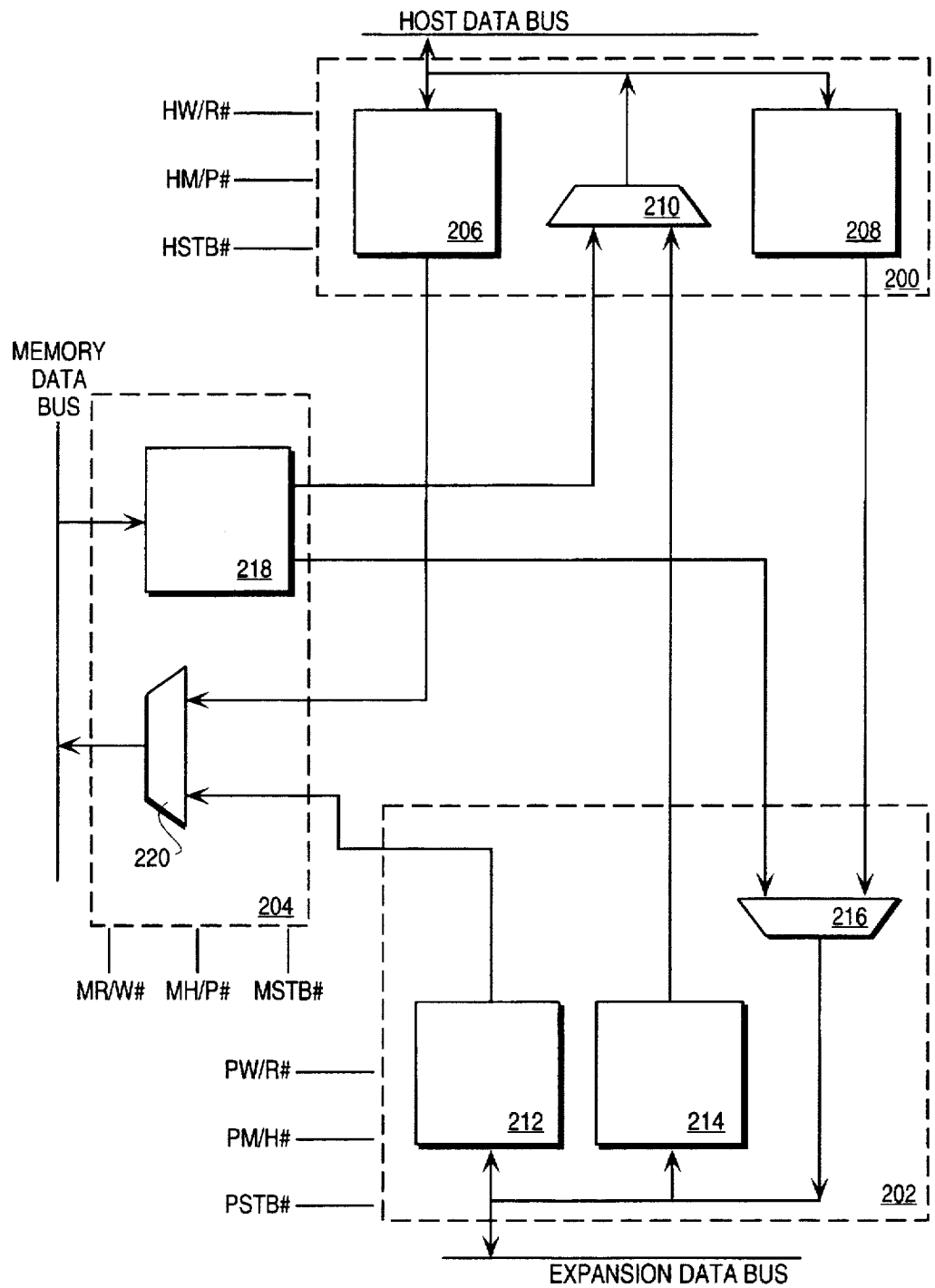
FIG. 2 illustrates an embodiment of the present invention.

One embodiment of the DPU 112 is shown in FIG. 2. The DPU is comprised of three basic structural blocks. A host data interface 200 is coupled to the data bus of the host bus 100. A system data interface 202 is coupled to the data bus of the expansion bus 102. A memory data interface 204 is coupled to the data lines of DRAM 110.

A unique feature of the present invention is that each interface has a separate uni-directional pathway dedicated to the transfer of data to or from each of the other interfaces. Unlike the prior art, no two interfaces share a bi-directional internal bus. Moreover, in this embodiment, all but one of the interfaces includes at least one posting write buffer to delay the transfer of data from one interface to another. In the prior art, all post buffers were found at the memory interface, thus requiring the host and system interfaces to complete arbitration for the internal bus before even being permitted to post data.

Host data interface 200 includes a host/memory post buffer 206, a host/system post buffer 208, and a multiplexer 210. System (expansion bus) data interface 202 includes a system/memory post buffer 212, a system/host post buffer 214, and a multiplexer 216. Memory data interface 204 comprises a memory read staging buffer 218 and a multiplexer 220. The staging buffer 218 is provided to make the timing of a memory read compatible with the timing of the destination bus.

According to the present invention, the routing and buffering of data are controlled by three control signals associated with each interface. A directional or READ/WRITE signal controls whether data is written into the interface or read out of the interface. (To preserve consistency with common terminology, for the memory interface only, data is read into the interface and written out of it.) A steering control signal determines which data path the data is to follow, i.e., with which interface the interface receiving the control signal will interact. The third signal in the set is a timing or strobe signal that either latches data into the interface from the associated data bus or selects data to be driven onto the data bus from the interface, depending upon the state of the directional signals.

Figure 3A:
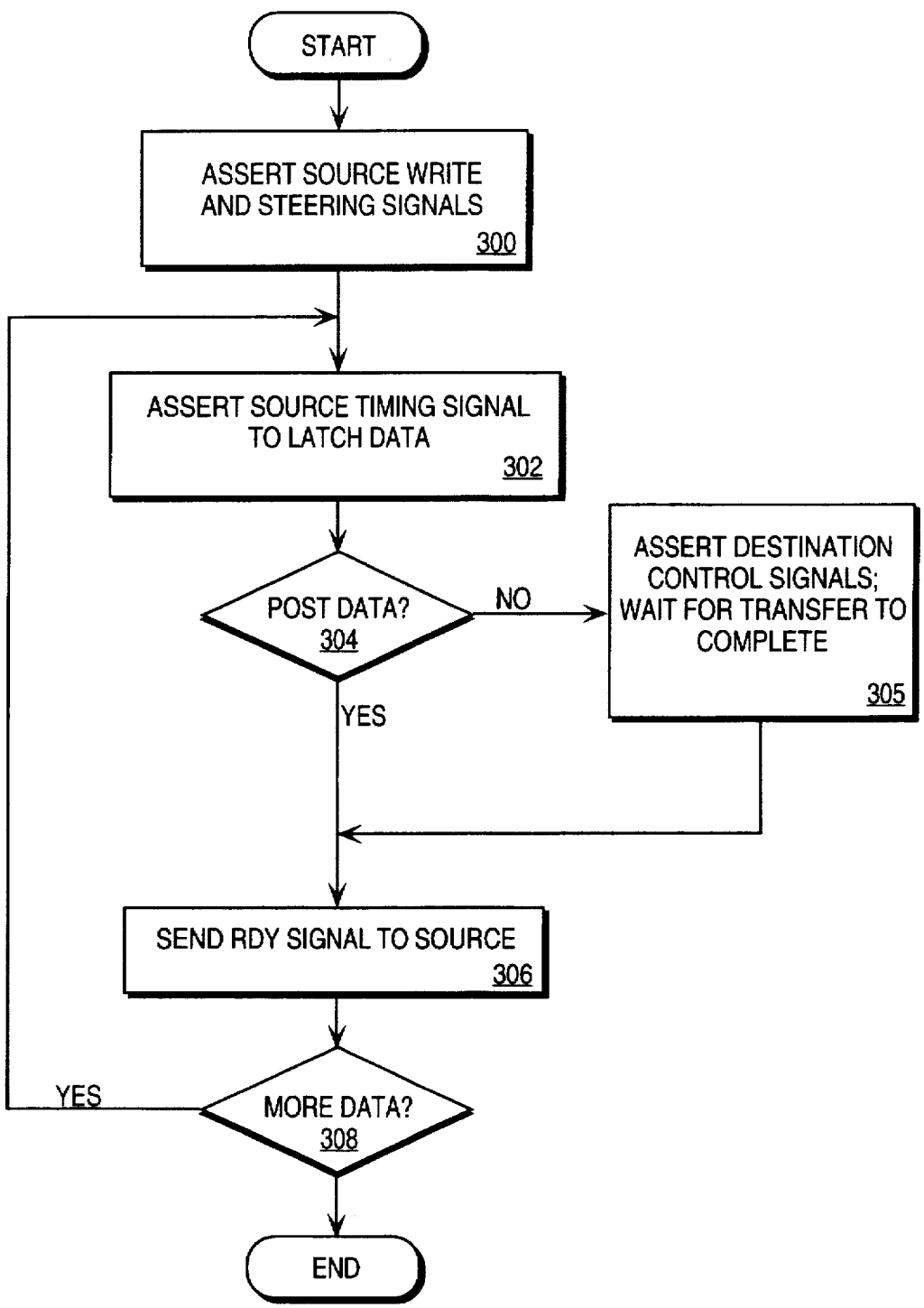
FIGS. 3A and 3B are flowcharts illustrating a write cycle of the present invention.

The operation of the DPU of this embodiment will now be described for a source write cycle with respect to FIG. 2 and the flowcharts of FIGS. 3A and 3B. In general, the latching of data into the interface associated with the bus acting as the source of data signals is controlled by control signals associated with the source bus. On the other hand, the transfer of data from the buffers in the source interface to the destination interface is controlled by control signals associated with the destination bus.

In order to transfer information between interfaces, the directional and steering control signals associated with the source interface are first asserted (step 300). The directional and steering signals determine whether information is being transferred to or from the source interface and which interface the source interface will interact, respectively. Note that by definition when an interface acts as a source interface it is transferring data out of the interface, while when it acts as a destination interface it is receiving data regardless of which interface initiated the transfer. The directional signals are fed into the enable inputs of selected logic units in the DPU, including bi-directional tristate bus drivers at the data path input/output pins coupled to the buses (not shown). Similarly, the steering signals are fed into the enable inputs of a number of logic units in the DPU. In conjunction with the rest of this disclosure, the wiring of the control signals in the DPU would be obvious to one skilled in the art.

Upon receipt of a source timing or strobe signal the appropriate buffer within the source interface latches the data (step 302). In this embodiment, the host interface 200 features two posting buffers 206 and 208, each dedicated to a different destination interface. Similarly, the system data interface 202 includes two posting buffers 212 and 214.

Each posting buffer allows the source bus master to perform a burst transfer of data to the posting buffer without needing to wait for control of the destination bus and the completion of the write cycle to the destination bus. This feature is especially useful for performing a posted burst transfer of a cache line to memory, allowing the source bus to become occupied only for a minimum amount of time. This buffer is also useful in a write-back cache application for holding a write-back cache line while the replacement cache line is being read from memory. Moreover, the use of two post buffers in an interface permits the source bus master to perform posted burst transfers of data to two separate destination buses while minimizing the time dependency of a transfer to one bus on the transfer time of the other bus.

The posting buffers within an interface are selected according to the state of the steering signal (HM/P# in the host data interface or PM/H# in the system data interface), which determines the destination interface. The memory data interface 204 does not have a posting buffer because memory data is transferred out only upon request from another interface. Thus, the requesting interface is ready to receive the data and there is no need to delay its transfer. The buffer 218 shown in memory data interface 204 is not a posting buffer, but rather a staging buffer included for timing purposes.

Once the data is latched into the source interface, it must be determined whether the transfer of data to the destination data interface is to be delayed, i.e., posted (step 304). During a nonposted write cycle (step 305), the source bus waits until the receipt of a ready (RDY) signal (step 306), which indicates the completion of a transfer to the destination, before attempting to transfer another word of data. On the other hand, to achieve posting, the present invention essentially "fakes out" the host CPU or expansion data bus master into believing that a data word has been transferred to the destination, allowing it to send out the next data word. If data is to be posted, after a word has been latched in the source buffer (such as 206 or 208), a RDY signal will be sent to the source bus master (step 306), prompting the source bus master to send the next data word (step 308). A source timing signal, such as HSTB#, is then asserted to latch this next piece of data into the source buffer, which acts as a first-in-first-out (FIFO) stack (step 302). It is then determined whether the next piece of data is to be posted (step 304).

Figure 3B:
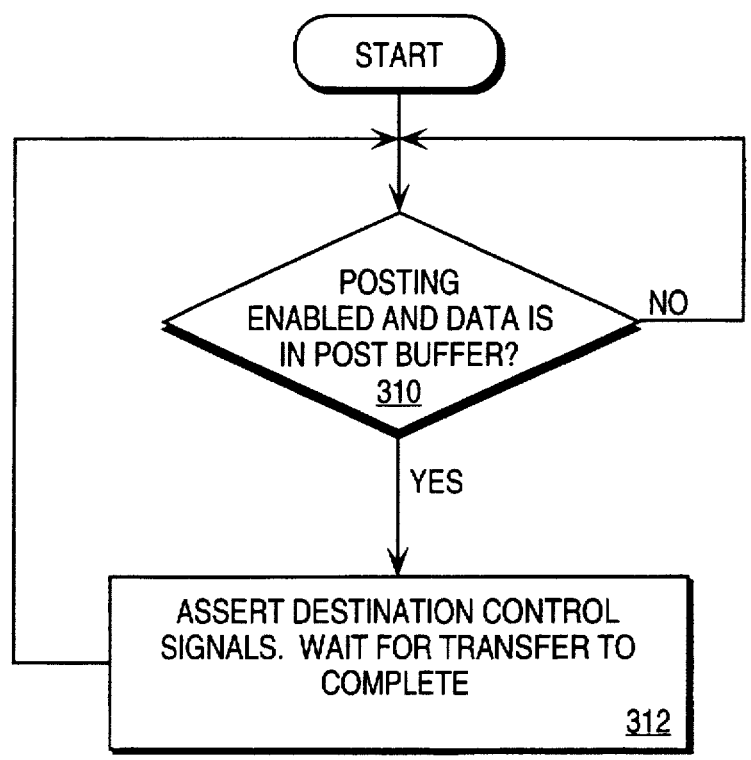

The process of FIG. 3B performs continuous monitoring to determine whether posting has been enabled and data is in the post buffer (step 310). If true, then the destination control signals are asserted to perform a transfer of data from the source post buffer into the destination interface and ultimately to the destination bus (step 312). This process continues, independent of source bus activity, until all data has been transferred out of the post buffer.

Figure 4A:
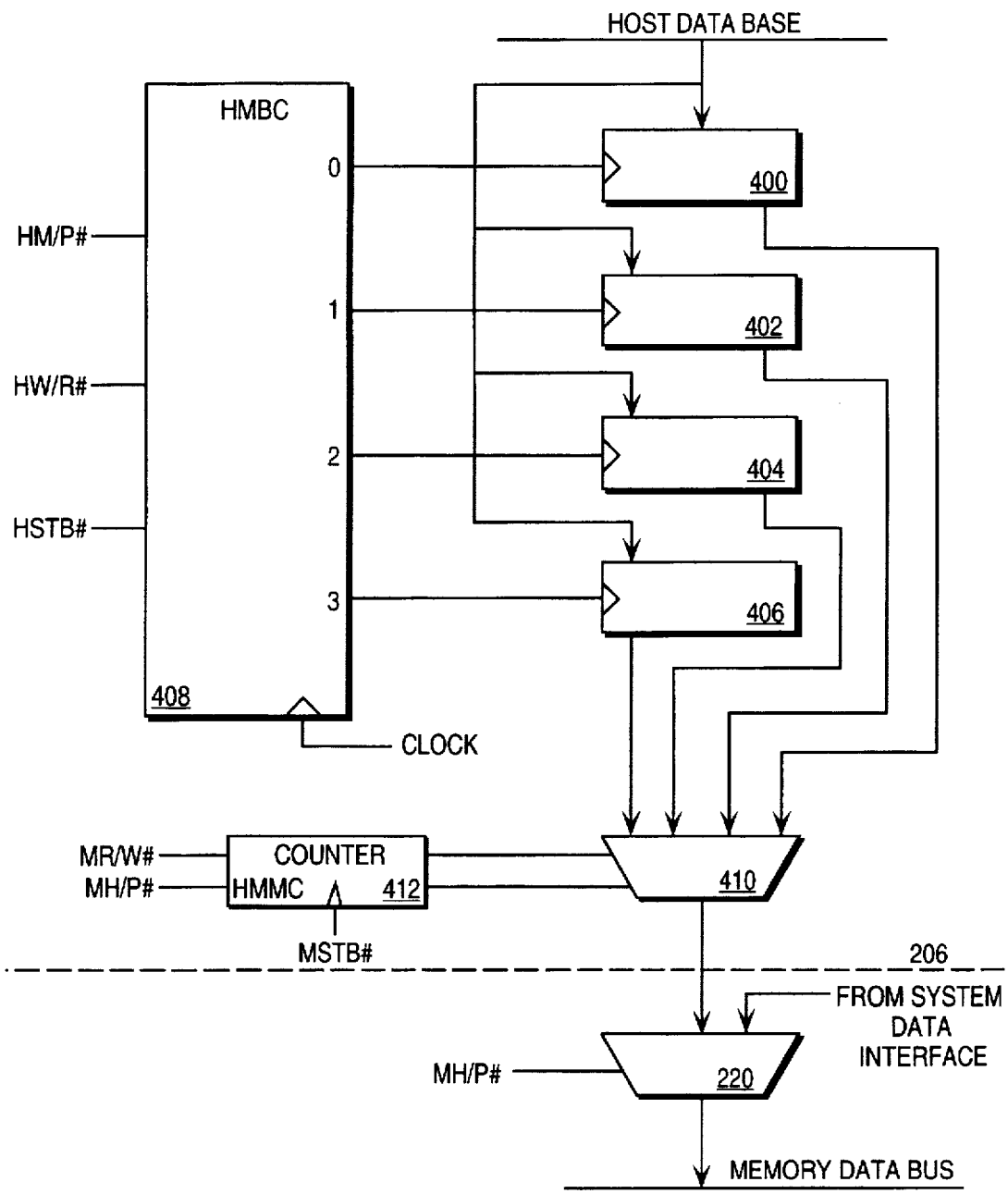
FIG. 4a illustrates control of the host to memory post buffer of the present invention.
Figure 4B:
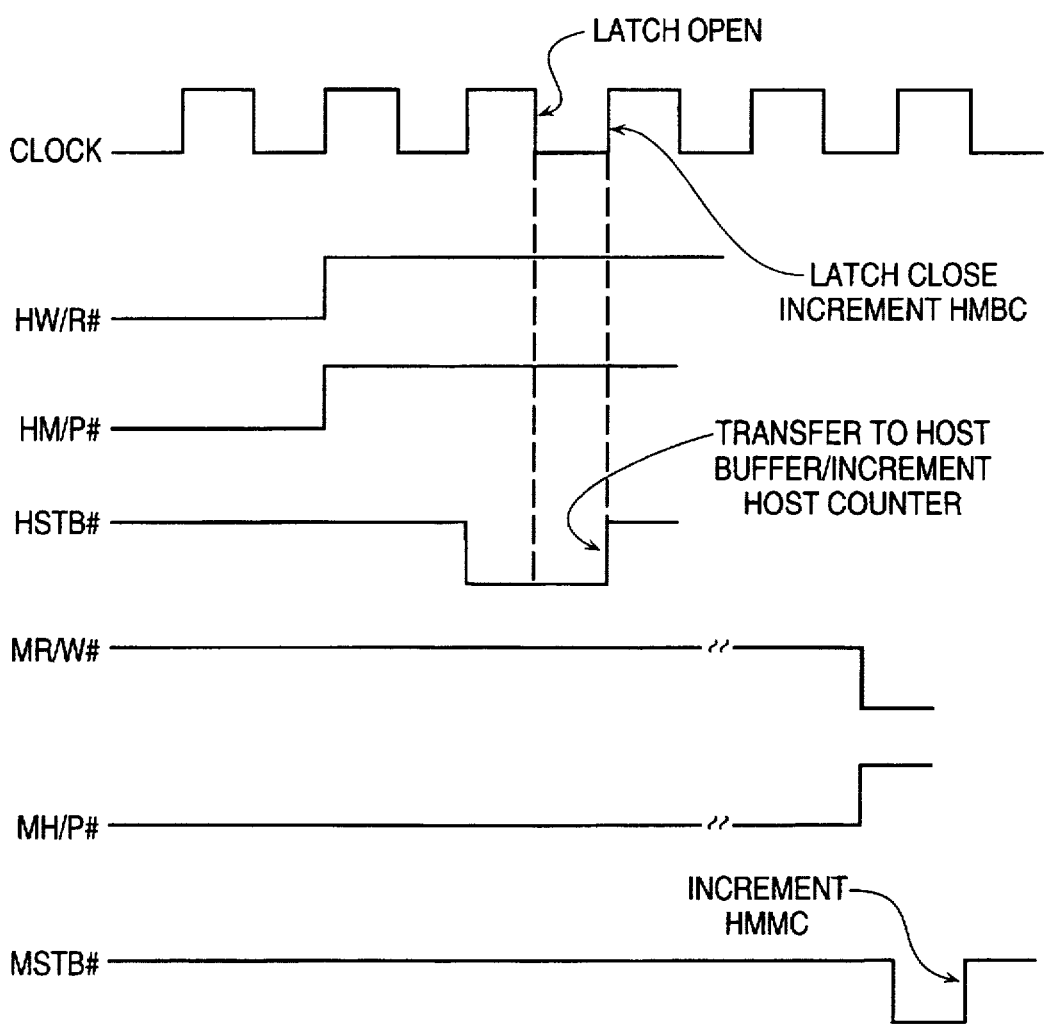
FIG. 4b is a timing diagram of a host-to-memory transfer implemented by the present invention.

The operation of the preferred embodiment will now be described in greater detail with respect to the examples illustrated in FIGS. 4a, 4b, 5a, and 5b. FIGS. 4a and 4b illustrate the transfer of data from the host data bus to the memory data bus. FIG. 4a is a logic circuit diagram of the host/memory post buffer 206 and memory data multiplexer 220 illustrating the control structure in detail. FIG. 4b is the timing diagram associated with the transfer of data from the host data bus to the memory data bus. To initiate the transfer, the host WRITE/READ signal (HW/R#) and host memory/system bus steering signal (HM/P#) must be asserted to determine the direction and steering of the data. Here, the host is configured to perform a write when the HW/R# signal is high and steers the data towards the memory data interface when the HM/P# signal is high.

The timing or strobe signal (HSTB#) is active low. In this embodiment, the host is synchronous with the clock, meaning that the strobe signal does not by itself trigger a data transfer, but rather qualifies the clock to transfer the data. Here, at the first falling clock edge after assertion of the host strobe signal, one of the latches 400, 402, 404 or 406, which is pointed to by the HMBC (Host/Memory Buffer Control) 408, is opened to accept data off of the host data bus. The latch is closed upon the next rising clock edge, completing the transfer of data into the source buffer 206. At that time the HMBC 408 increments to point to the next latch to receive data. The HSTB# signal can then be negated (made high) to end the transfer. In this example, up to four words of data may be posted in the four deep buffer 206 through repeated transfers of data into the latches 400–406 as the HMBC 408 is incremented. Note that each buffer control unit of the present invention may be implemented as a counter feeding its count into a decoder. Alternatively, the buffer control unit can be a shift register with the output of its last stage tied to the input of its first stage for shifting a single bit in a "wraparound" manner.

When the memory data interface is ready to receive data from the post buffer, it asserts a memory write signal, i.e., the memory READ/WRITE (MR/W#) signal is asserted low and the memory host/system bus steering signal (MH/P#) is set high. Actual data transfer to the memory data bus occurs upon assertion of the memory strobe signal (MSTB# low). The memory is not synchronous with the clock, meaning that the transfer is actuated by the MSTB# signal itself without requiring qualification of the clock. Data is transferred to the data memory interface through 4-by-1 multiplexer 410 in the host data interface to multiplexer 220 in the memory data interface. The correct latch in the four deep buffer 206 for transferring data to the memory data interface is selected by the HMMC (Host/Memory Mux Control) 412, a counter selecting inputs of multiplexer 410. After the data transfer is complete, the memory strobe signal is negated (made high), which increments the HMMC 412 to select the next latch in buffer 206.

Figure 5A:
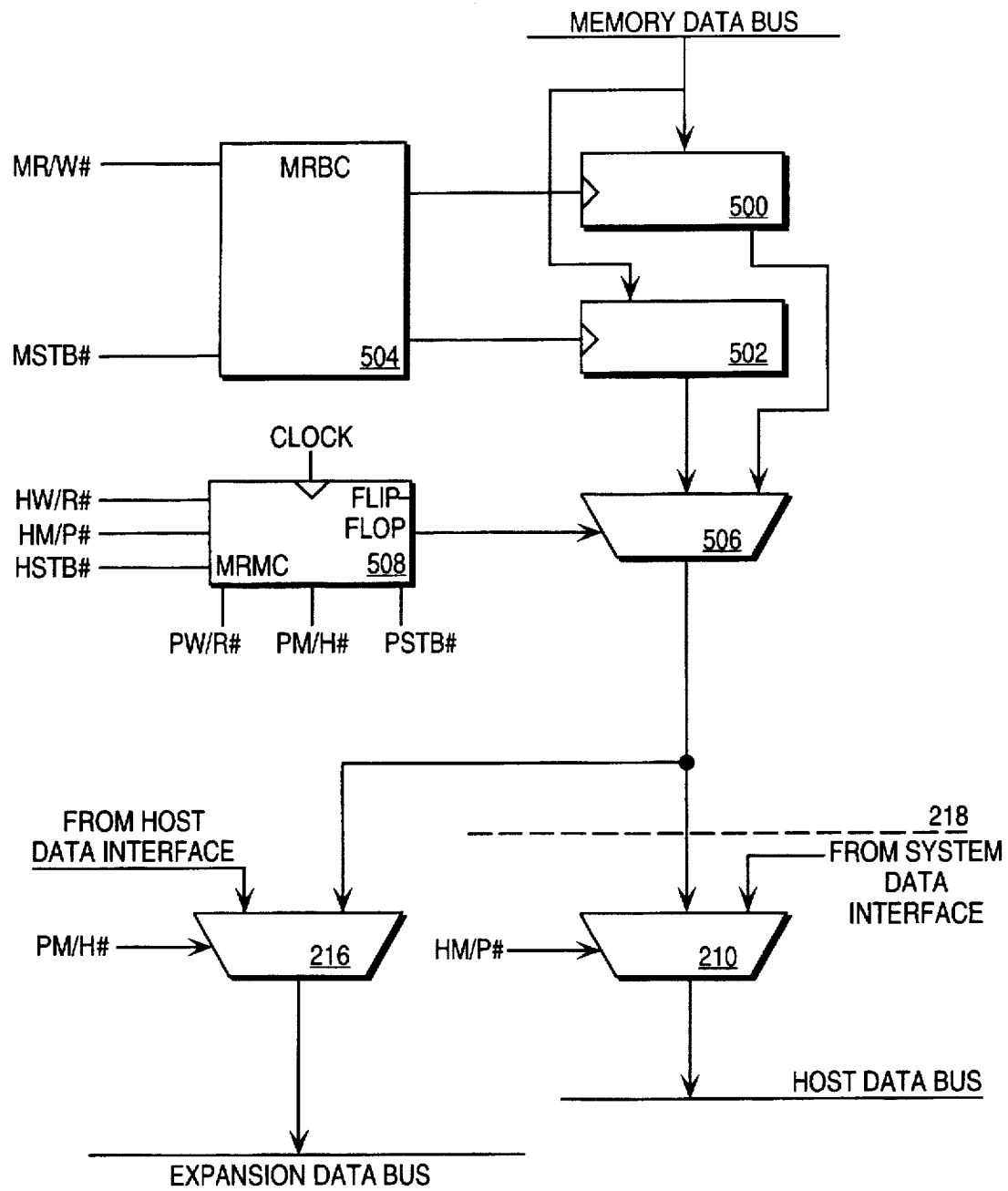
FIG. 5a illustrates control of the memory staging buffer of the present invention.
Figure 5B:
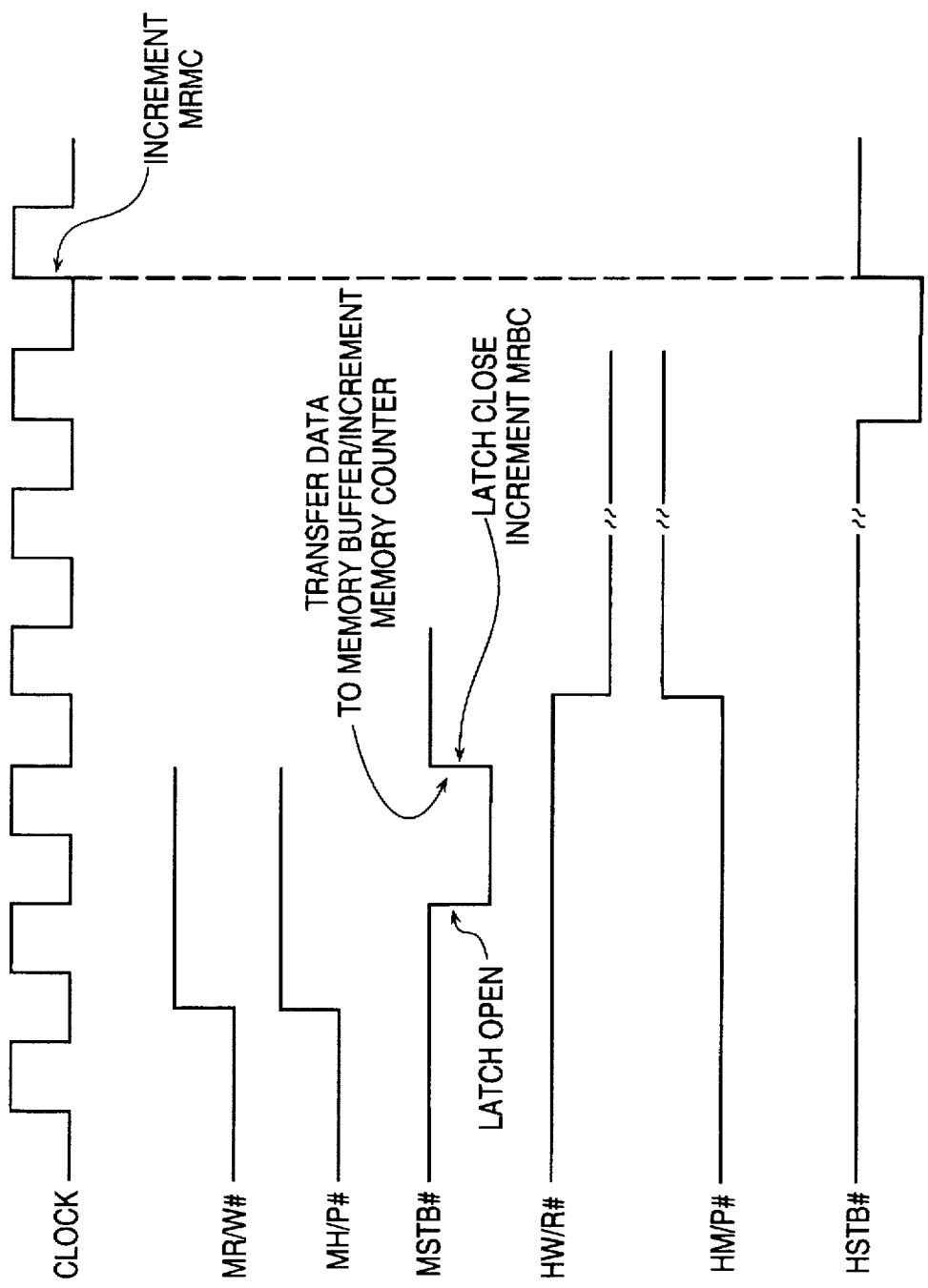
FIG. 5b is a timing diagram of a memory-to-host transfer implemented by the present invention.

A read from memory to host will now be described with reference to FIGS. 5a and 5b. In FIG. 5a, staging buffer 218 is shown comprising two latches 500 and 502, which are enabled by the MRBC (Memory Read Buffer Control) 504. The MRBC 504 is controlled by the memory control signals. The memory data bus serves as the input to the latches, while the output of the latches is fed to the 2 by 1 multiplexer 506, which is controlled by the MRMC (Memory Read Mux Control) 508. The MRMC 508, in turn, is controlled by control signals associated with both the host and system data buses, the reason being that the memory data interface does not include separate buffers each dedicated to a destination interface. The output of multiplexer 506 is fed into multiplexer 210 of the host data interface 200 and to multiplexer 216 of the expansion data interface.

Data transfer from memory to host is accomplished as follows. The MR/W# line is set high to perform a read to the host. Because the memory data interface does not include separate buffers for each destination interface, the state of the MH/P# signal is irrelevant for a memory read. In general, the source steering signal is not used for transfers from an interface having only one write buffer.

Referring back to the memory read, the memory strobe signal MSTB# is asserted (set low) to latch data off of the memory data bus into either latch 500 or 502, depending upon which is pointed to by the MRBC 504. When the memory strobe signal is deasserted (made high), the data is latched and the MRBC 504 is incremented to point to the other latch.

The host data interface is set up to receive the data read from memory by setting the HW/R# line low and the HM/P# line high. When the host is ready to receive the data it asserts HSTB#, which results in a transfer of the data to multiplexer 210 from multiplexer 506. The rising edge of the clock, when HSTB# is asserted, will cause the MRMC 508 to increment, i.e., toggled to point to the next latch for outputting data.

A method and apparatus permitting fully concurrent data routing has been described. Each non-memory bus can post data to be written to a destination bus without waiting for control of the destination bus and the completion of a write cycle. Moreover, control of this routing has been accomplished with a minimum number of three control lines per interface for a three-interface system.

Of course, the invention may be subject to many variations. For example, more interfaces may be added to the invention to accommodate more buses in a multiple bus system, as long as there is an accompanying increase in the components within each interface and the number of control signals. In particular, the present invention would require multiplexers with more than two inputs for receiving data from more than two other interfaces. Moreover, each interface need not include separate post buffers dedicated to each destination interface. Further, some interfaces, such as the system data interface, need not utilize a post buffer. Rather, in some instances, it may be preferable to use only a staging buffer to handle the timing of data transfers.

Figure 6:
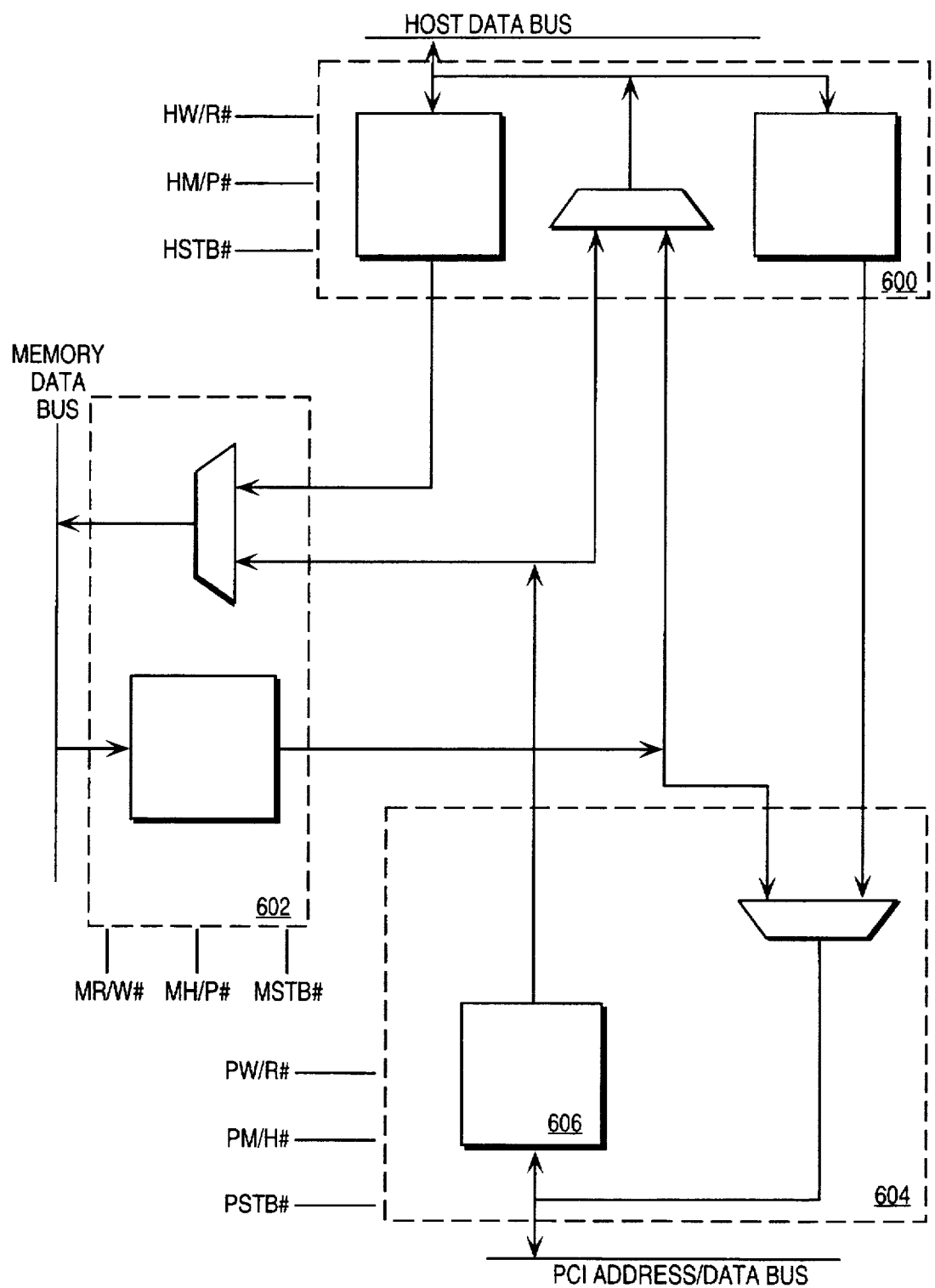
FIG. 6 illustrates another embodiment of the present invention.

For example, FIG. 6 is an embodiment of the present invention for use with the peripheral component interconnect (PCI) bus. This embodiment comprises a host data interface 600, a memory data interface 602 and a PCI data interface 604. The host data interface 600 and the memory data interface 602 are substantially the same as that shown in FIG. 2. However, the PCI data interface uses only a single two-deep post buffer. Devices on the PCI bus are slaves with respect to the CPU on the host bus. The PCI bus devices cannot initiate a write cycle to the host bus, but rather can only respond to a read or write request from the host. Accordingly, there is no need to provide two PCI post buffers that would allow concurrent posted writes to both memory and the host. One post buffer for PCI-initiated writes to memory is sufficient Also, a two-latch PCI post buffer has been found adequate for most applications.

Although the invention has been described in conjunction with various embodiments, it will be appreciated that modifications and alterations might be made without departing from the spirit and scope of the invention.

What is claimed is:

1. A data router for routing data among a plurality of buses comprising:
 a plurality of interface means, each interface means for engaging in data transfers between an associated bus and at least two other interface means, each interface means comprising:
  transfer means for transferring data from said associated bus to an interface output;
  receiving means for receiving data from the at least two other interface means;
  direction control means responsive to a direction control signal for determining whether data is to be transferred into each said interface means from another interface means or out of said each interface means to another interface means;
  steering control means responsive to a steering control signal for determining with which other interface means said each interface means will engage in a transfer of data; and
  timing means responsive to a timing signal for determining when data is to be transferred from an associated bus into said each interface means, said timing means further for determining when data is to be transferred from said at least one other interface means into said each interface means in response to said timing signal, said timing signal from said associated bus; and
 each interface means coupled to the at least two other interface means by way of separate data paths between the interface output and the receiving means of each other interface means, each interface means transferring data received by said receiving means to said associated bus.

2. The data router of claim 1, at least two of said interface means further comprising:
 at least one posting means for posting data transferred from said associated bus to said interface output, each posting means for transferring data to a different of said other interface means.

3. The data router of claim 1, said plurality of buses comprising:
 a host data bus, an expansion data bus, and a memory data bus.

4. The data router of claim 3, said expansion data bus comprising:
 a peripheral component interconnect (PCI) data bus.

5. A data router for routing data among a plurality of buses comprising:
 a plurality of interfaces, each interface for engaging in data transfers between an associated bus and at least two other interfaces, each interface comprising:
  a selector to receive data from the least two other interfaces, said selector having an input coupled to an interface output and an output coupled to said associated bus;
  each interface coupled to the at least two other interfaces by way of separate data paths between the interface output and the selector of each other interface which the interface will engage in data transfer with;
  each interface transferring data received by said selector to said associated bus;
  a direction control input, wherein each interface determines whether data is transferred into each interface from said other interfaces or out of said each interface to said other interfaces in response to a direction control signal received by the direction control input associated with said each interface;
  a steering control input, wherein said each interface determines with which other interface it will engage in a transfer of data in response to a steering control signal received by the steering control input associated with said each interface; and
  a timing input, wherein said each interface determines when data is to be transferred from said associated bus into said each interface in response to a timing signal received by the timing input associated with each said interface, wherein each interface further determines when data is to be transferred from said other interfaces into said each interface in response to said timing signal, said timing signal from said associated bus.

6. The data router of claim 5 in which at least one of each of said plurality of interfaces further comprises:
 a staging buffer having a staging buffer input coupled to said associated bus and a staging buffer output coupled to said interface output, said interface output coupling data from said associated bus through said staging buffer.

7. The data router of claim 5 said plurality of buses comprising:
 a host data bus, an expansion data bus, and a memory data bus.

8. The data router of claim 7 said expansion data bus comprising
 a peripheral component interconnect (PCI) data bus.

9. The data router of claim 5 for routing data among a plurality of buses, wherein at least two of said plurality of interfaces further each comprising at least one posting buffer for each other interface of the plurality of interfaces which the interface will engage in data transfer with, each posting buffer having an input coupled to said associated bus and an output coupled to said interface output for transferring data from the interface to a data path of the separate data paths.

10. A method for routing data among a plurality of buses in a computer system, each bus associated with an interface to engage in data transfers between said associated bus and at least two other interfaces, said method comprising the steps of:
 asserting a source direction control signal indicating that data is to be transferred out of said source interface;
 asserting a source timing signal to transfer data from said source bus to said source interface;
 asserting a destination direction control signal indicating that data is to be transferred into said destination interface;
 asserting a destination steering control signal indicating to said destination interface that said destination interface is to engage in a transfer of data with said source interface;
 asserting a data transfer timing signal from said destination bus to control the transfer of data from said source interface to said destination interface;
 transferring said data from a source bus to an associated source interface;
 selecting a separate data path from a plurality of separate data paths for routing said data to a destination interface, each separate data path corresponding to one of said at least two other interfaces;
 routing said data from said source interface to said destination interface using said separate data path;

receiving said data at said destination interface; and transferring said data from said destination interface to an associated destination bus.

11. The method of claim 10 further comprising the step of:

asserting a source steering control signal indicating to said source interface that said source interface is to engage in a transfer of data with said destination interface.

12. A computer system comprising:

a processor;

a main memory;

a plurality of buses, said processor coupled to a first of said plurality of buses, said main memory coupled to a second of said plurality of buses;

a data router for routing data among said plurality of buses, said router having a plurality of interfaces, each interface for engaging in data transfers between an associated bus from said plurality of buses and at least two other interfaces, each interface comprising:

a selector to receive data from the least two other interfaces, said selector having an input coupled to an interface output and an output coupled to said associated bus;

each interface coupled to the at least two other interfaces by way of separate data paths between the interface output and the selector of each other interface which the interface will engage in data transfer with;

each interface transferring data received by said selector to said associated bus;

a direction control input, wherein each interface determines whether data is transferred into said each interface from said other interfaces or out of said each interface to said other interfaces in response to a direction control signal received by the direction control input associated with said each interface;

a steering control input, wherein said each interface determines with which other interface it will engage in a transfer of data in response to a steering control signal received by the steering control input associated with said each interface; and a timing input, wherein said each interface determines when data is to be transferred from said associated bus into said each interface in response to a timing signal received by the timing input associated with each said interface, wherein each interface further determines when data is to be transferred from said other interfaces into said each interface in response to said timing signal, said timing signal from said associated bus.

13. The computer system of claim 12, at least one interface further comprising:

a staging buffer having a staging buffer input coupled to said associated bus and a staging buffer output coupled to said interface output, said interface output coupling data from said associated bus through said staging buffer.

14. The computer system of claim 12, wherein at least two of said plurality of interfaces further each comprising at least one posting buffer for each other interface of the plurality of interfaces which the interface will engage in data transfer with, each posting buffer having an input coupled to said associated bus and an output coupled to said interface output for transferring data from the interface to a data path of the separate data paths.

* * * * *